(12) United States Patent
Hamilton, II et al.

(10) Patent No.: US 8,799,787 B2
(45) Date of Patent: Aug. 5, 2014

(54) EXPLICIT USE OF USER CONTEXT OBJECTS IN A VIRTUAL UNIVERSE

(75) Inventors: Rick A. Hamilton, II, Charlottesville, VA (US); Neal M. Keller, Pleasantville, NY (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1213 days.

(21) Appl. No.: 12/127,164

(22) Filed: May 27, 2008

(65) Prior Publication Data

US 2009/0300493 A1   Dec. 3, 2009

(51) Int. Cl.
    *G06F 3/048*   (2013.01)

(52) U.S. Cl.
    USPC ............ 715/757; 715/706; 715/733; 715/753

(58) Field of Classification Search
    USPC ................................. 715/753, 757, 733, 706
    See application file for complete search history.

(56) References Cited

U.S. PATENT DOCUMENTS

| | | | |
|---|---|---|---|
| 5,736,982 A | 4/1998 | Suzuki et al. | |
| 5,737,533 A | 4/1998 | de Hond | |
| 6,643,639 B2 | 11/2003 | Biebesheimer et al. | |
| 6,693,651 B2 | 2/2004 | Biebesheimer et al. | |
| 6,701,311 B2* | 3/2004 | Biebesheimer et al. | 1/1 |
| 6,778,193 B2 | 8/2004 | Biebesheimer et al. | |
| 6,785,676 B2 | 8/2004 | Oblinger | |
| 6,853,998 B2 | 2/2005 | Biebesheimer et al. | |
| 6,873,990 B2 | 3/2005 | Oblinger | |
| 7,468,729 B1 | 12/2008 | Levinson | |
| 2002/0107842 A1 | 8/2002 | Biebesheimer et al. | |
| 2004/0024846 A1* | 2/2004 | Randall et al. | 709/219 |
| 2004/0075677 A1 | 4/2004 | Loyall et al. | |
| 2005/0125229 A1 | 6/2005 | Kurzweil | |
| 2005/0143108 A1 | 6/2005 | Seo et al. | |
| 2005/0216346 A1 | 9/2005 | Kusumoto et al. | |
| 2006/0031578 A1 | 2/2006 | Pelletier | |
| 2008/0091692 A1* | 4/2008 | Keith et al. | 707/100 |
| 2008/0183678 A1 | 7/2008 | Weston et al. | |
| 2008/0195699 A1 | 8/2008 | Min et al. | |
| 2008/0201321 A1 | 8/2008 | Fitzpatrick et al. | |
| 2008/0249987 A1 | 10/2008 | Ogasawara | |
| 2008/0250001 A1 | 10/2008 | Onda et al. | |

(Continued)

OTHER PUBLICATIONS

Obisesan, Office Communication for U.S. Appl. No. 12/127,174 dated Mar. 4, 2011, 15 pages.

(Continued)

*Primary Examiner* — Amy Ng
*Assistant Examiner* — Sajeda Muhebbullah
(74) *Attorney, Agent, or Firm* — Lisa Ulrich; Hoffman Warnick LLC

(57) ABSTRACT

An approach that facilitates explicit use of user context objects in a virtual universe is described. In one embodiment, there is a user context object tool that includes a user context object retrieving component configured to retrieve the plurality of user context objects for presentation to the avatar. A user context object selection and modification component is configured to receive a user context object selection and any desired modifications made to the user context object selection. A user context object permissions component is configured to permit the avatar to interact with the virtual universe in accordance with the user context object selection.

21 Claims, 7 Drawing Sheets

(56) References Cited

U.S. PATENT DOCUMENTS

| | | | |
|---|---|---|---|
| 2008/0262911 | A1 | 10/2008 | Altberg et al. |
| 2008/0263446 | A1 | 10/2008 | Altberg et al. |
| 2008/0301112 | A1 | 12/2008 | Wu |
| 2009/0099925 | A1* | 4/2009 | Mehta et al. .................... 705/14 |
| 2009/0144211 | A1 | 6/2009 | O'Sullivan et al. |
| 2009/0158161 | A1* | 6/2009 | Gibbs et al. .................. 715/733 |
| 2009/0158170 | A1* | 6/2009 | Narayanan et al. ........... 715/753 |
| 2009/0210301 | A1 | 8/2009 | Porter et al. |
| 2009/0299960 | A1 | 12/2009 | Lineberger |

OTHER PUBLICATIONS

Kandogan et al., "Avatar Semantic Search: A Database Approach to Information Retrieval," Jun. 2006, pp. 790-792, SIGMOD 2006, Chicago, IL.

Charles et al., "Dynamic Player Modelling: A Framework for Player-Centred Digital Games," Nov. 2004, 7 pages, School of Computing and Information Engineering, University of Ulster, Northern Ireland.

Dinoff et al., "Learning and Managing User Context in Personalized Communications Services," May 2009, pp. 33-36, AVI 2006, Venice, Italy.

Bauer et al., "Real Time User Context Modeling for Information Retrieval Agents," 2001, 3 pages, CIKM 2001, Atlanta, GA.

Dragone et al., "Social Interaction Between Robots, Avatars & Humans," Feb. 2005, pp. 24-29, IEEE International Workshop on Robots and Human Interactive Communication.

Yang et al., "Machine Learning-Based Intelligent Recommendation in Virtual Mall," Aug. 2004, pp. 2634-2639, Proceedings of the Third International Conference on Machine Learning and Cybernetics, Shanghai.

Lee et al., "Precomputing Avatar Behavior From Human Motion Data," Jun. 2005, pp. 158-174, Graphical Models vol. 68 (2006).

Ballegooij, et al., "Navigation by Query in Virtual Worlds," Jan. 2001, pp. 77-83 and 148, ACM 2001.

Obisesan, Office Communication for U.S. Appl. No. 12/127,174 dated Oct. 14, 2010, 16 pages.

Obisesan, Office Action Communication for U.S. Appl. No. 12/127,174 dated Oct. 12, 2011, 16 pages.

Obisesan, Office Action Communication for U.S. Appl. No. 12/127,174 dated Jan. 17, 2012, 24 pages.

Obisesan, Notice of Allowance and Fee(s) Due for U.S. Appl. No. 12/127,174 dated May 9, 2012, 10 pages.

* cited by examiner

EXPLICIT USE OF USER CONTEXT OBJECTS IN A VIRTUAL UNIVERSE

CROSS REFERENCE TO RELATED APPLICATIONS

This patent application relates to commonly-assigned U.S. patent application Ser. No. 12/127,174, entitled "APPLICATION OF USER CONTEXT TO SEARCHES IN A VIRTUAL UNIVERSE", and filed concurrently with this application.

FIELD OF THE INVENTION

This invention relates generally to virtual universes and more specifically to facilitating the explicit use of user context objects within a virtual universe for a variety of applications including but not limited to performing resource searches.

BACKGROUND OF THE INVENTION

Virtual universes or virtual worlds are computer-based simulated environments intended for its users to inhabit and interact via avatars, which are personas or representations of the users of the virtual universes and generally take the form of two-dimensional or three-dimensional human or fantastical representations of a person's self. One well known virtual universe is Second Life which is a trademark of Linden Research in the United States, other countries or both. Avatars in these types of virtual universes participate in a wide range of business and social experiences with other avatars and resources such as landmarks, events, retail stores, services, etc.

As the number of avatars and resources proliferate in virtual universes, users of these universes will increasingly rely on search and retrieval systems to discover relevant resources for facilitating these business and social experiences. Typical virtual universes use simple search and retrieval systems to perform straightforward text searches. Search and retrieval systems that employ simple text searches often do not provide the most relevant results. In order to obtain better results, users will often have to supply additional information to enhance the search. This is frustrating to users because they typically have limited time, patience, ability and interest to provide this information. Because it is frustrating for users to obtain information on resources available in virtual universes through currently available search and retrieval systems, users will often attempt to obtain such information from other users through their avatars. However, this is not a suitable option because often times other avatars are not aware of all resources that could be the subject of an inquiry or if they do have some knowledge then it comes at cost with regard to time and quantity at which information is conveyed to the interested avatar. Thus, current approaches to discovering relevant resources in a virtual universe are not suited to enhancing business and social experiences of avatars.

SUMMARY OF THE INVENTION

In one embodiment, there is a method for facilitating use of a plurality of user context objects determined for an avatar that is online in a virtual universe. In this embodiment, the method comprises: presenting the plurality of user context objects to the avatar; receiving a user context object selection from the avatar, wherein the user context object selection contains one of the plurality of user context objects determined for the avatar and any desired modifications made to the user context object selected by the avatar; and permitting the avatar to interact with the virtual universe in accordance with the user context object selection.

In a second embodiment, there is a method for performing a search for a resource in a virtual universe using selectable and modifiable user context objects. In this embodiment, the method comprises: presenting a plurality of user context objects determined for an avatar that is online in the virtual universe; receiving a user context object selection from the avatar, wherein the user context object selection contains one of the plurality of user context objects determined for the avatar and any desired modifications made to the selected user context object; receiving a query from the avatar; and performing a resource search for the query in accordance with the selected user context object.

In a third embodiment, there is a computer system for facilitating use of a plurality of user context objects determined for an avatar that is online in a virtual universe. In this embodiment, the system comprises at least one processing unit and memory operably associated with the at least one processing unit. A user context object tool is storable in memory and executable by the at least one processing unit. The tool comprises a user context object retrieving component configured to retrieve the plurality of user context objects for presentation to the avatar. A user context object selection and modification component is configured to receive a user context object selection and any desired modifications made to the user context object selection. A user context object permissions component is configured to permit the avatar to interact with the virtual universe in accordance with the user context object selection.

In a fourth embodiment, there is a computer-readable medium storing computer instructions, which when executed, enables a computer system to facilitate use of a plurality of user context objects determined for an avatar that is online in a virtual universe. In this embodiment, the computer instructions comprises presenting the plurality of user context objects to the avatar; receiving a user context object selection from the avatar, wherein the user context object selection contains one of the plurality of user context objects determined for the avatar and any desired modifications made to the selected user context object; and permitting the avatar to interact with the virtual universe in accordance with the user context object selection.

In a fifth embodiment, there is a method for deploying a user context object tool for use in a computer system that facilitates use of a plurality of user context objects determined for an avatar that is online in a virtual universe. In this embodiment, a computer infrastructure is provided and is operable to present the plurality of user context objects to the avatar; receive a user context object selection from the avatar, wherein the user context object selection contains one of the plurality of user context objects determined for the avatar and any desired modifications made to the selected user context object; and permit the avatar to interact with the virtual universe in accordance with the user context object selection.

DETAILED DESCRIPTION OF THE INVENTION

Embodiments of this invention are directed to a technique for providing avatars that reside in a virtual universe with the capability to select user context objects and modify attribute values associated with these user context objects created for the avatars. The user context objects can reside in the avatars' inventories that contain their possessions within the virtual universe and the user context objects can be generated from the avatars' actions, possessions and knowledge obtained from the users of the avatars in the real world. These user context objects can be selected and attribute values modified by the avatars and used in a variety of different applications. For example, embodiments of this invention use these user context objects to perform a user context search within the virtual universe for a resource, apply a user context object selection to a robot avatar that is configured to allow the avatar to interact anonymously and semi-autonomously within the virtual universe, alter avatar characteristics so that an avatar can have the opportunity to interact within the virtual universe in a different manner, receive presence-based marketing opportunities while on-line in the virtual universe, and apply a user context object selection to an avatar sub-type of the avatar in order to allow the avatar to have different characteristics for different business and social interactions within the virtual universe.

Figure 1:
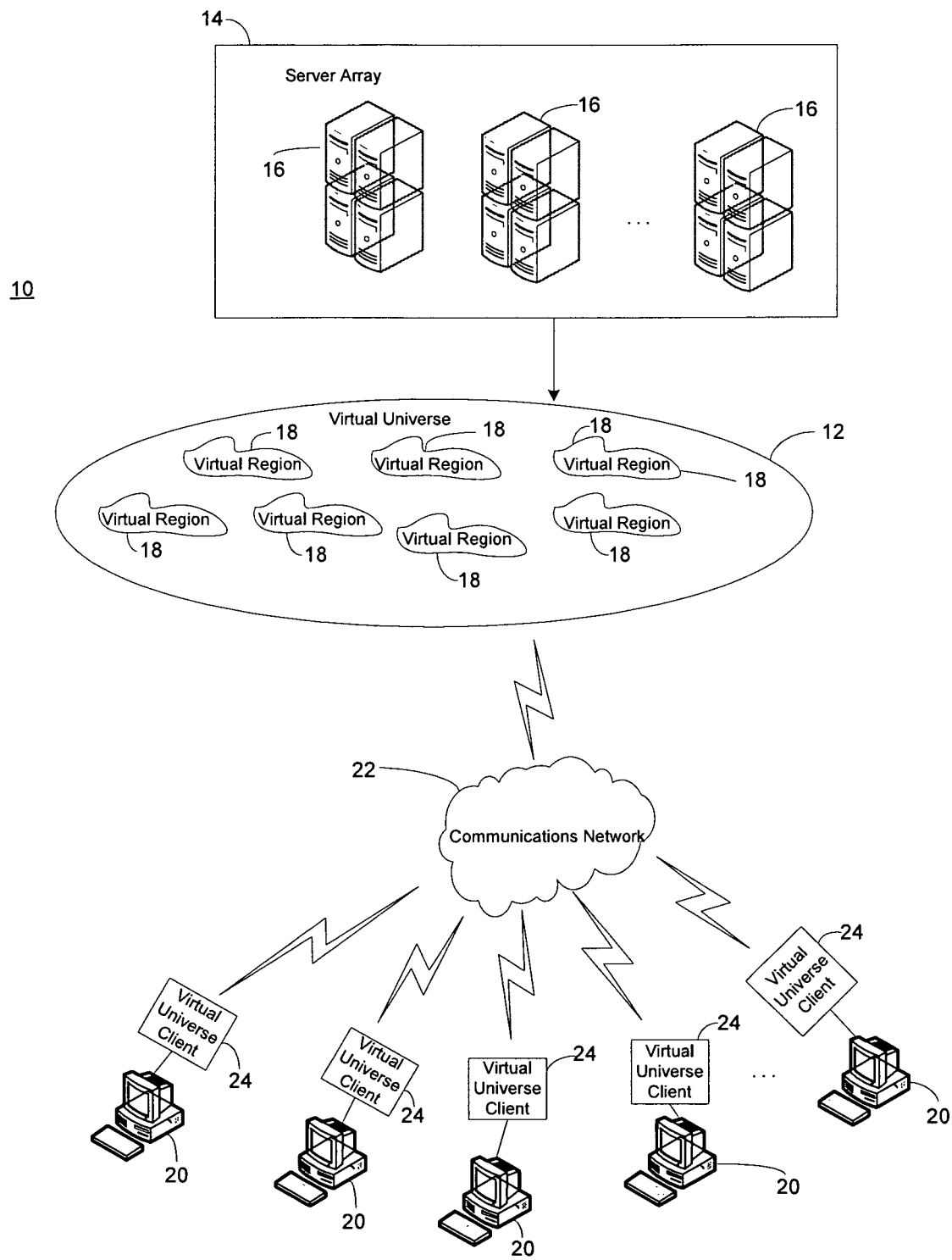
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which user context objects can be generated, selected, modified and applied in the virtual universe in a variety of different manners. As shown in FIG. 1, the networking environment 10 comprises a server array or grid 14 comprising a plurality of servers 16 each responsible for managing a sliver of virtual real estate within the virtual universe 12. A virtual universe can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20 interact with the virtual universe 12 through a communication network 22 via a virtual universe client 24 that resides in the computer. Below are further details of the virtual universe 12, server array 14, and virtual universe client 24.

Figure 2:
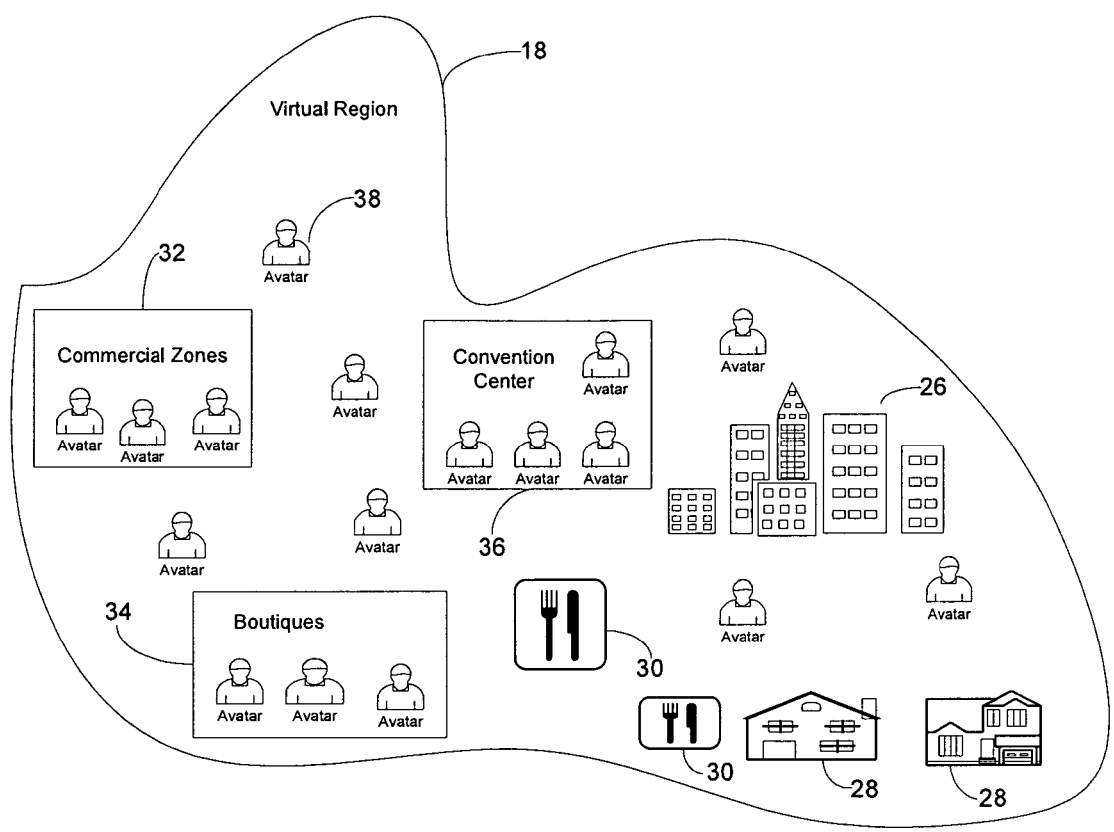
FIG. 2 shows a more detailed view of a virtual region shown in the virtual universe of FIG. 1.

FIG. 2 shows a more detailed view of what one virtual region 18 shown in the virtual universe 12 of FIG. 1 may comprise. As an example, the virtual region 18 shown in FIG. 2 comprises a downtown office center 26, homes 28, restaurants 30, commercial zones 32 and boutiques 34 for shopping and a convention center 36 for meetings and various conventions. Residents or avatars 38, which as mentioned above, are personas or representations of the users of the virtual universe, roam all about the virtual region by walking, driving, flying or even by teleportation or transportation which is essentially moving through space from one point to another, more or less instantaneously. These examples of items in the virtual region 18 shown in FIG. 2 are only illustrative of some things that may be found in a virtual region and those skilled in the art will recognize that these regions can have many more items that can be found in a real-life universe as well as things that do not presently exist in real life.

As the number of avatars and resources proliferate within these virtual regions 18, users will want to know where to buy certain goods and services, where to go for entertainment and generally to know what is happening. It is believed that simple search and retrieval systems that perform straightforward text searches will not be an adequate tool for enabling users to quickly and efficiently find out information that is suited particularly for them.

By generating a search that takes into account user context objects derived from past behavior in the virtual world and real world and that are explicitly selectable and modifiable by the user, the user is able to receive faster and more relevant responses to search queries without the need to complete extensive profiles. Other benefits for the user include the capability to fine tune user context objects generated for them to further improve perceived accuracy and/or to temporarily or permanently modify user context to alter the face a user shows in the virtual world based on perceived benefits and risks in social and business interactions. In addition, user context objects used in a searching embodiment benefits virtual universe grid owners (e.g., providers of virtual universes) because less system resources are required to search using robust user context information, presuming that resources are available to create and update the user contexts and associated attributes and values as background/batch processes, based on recent user behavior in the virtual universe and real life. Additional benefits to virtual universe grid owners may include increased revenue from land and advertising due to increased avatar satisfaction and hence time spent within the virtual universe. The user context objects also have benefits to providers of resources (e.g., advertisers) that include increased effectiveness and decreased cost of market research, market planning, strategic planning and implementation activities (e.g., age, gender, and demographic-specific advertising). Below are further details on the user context objects as used in a variety of embodiments.

Figure 3:
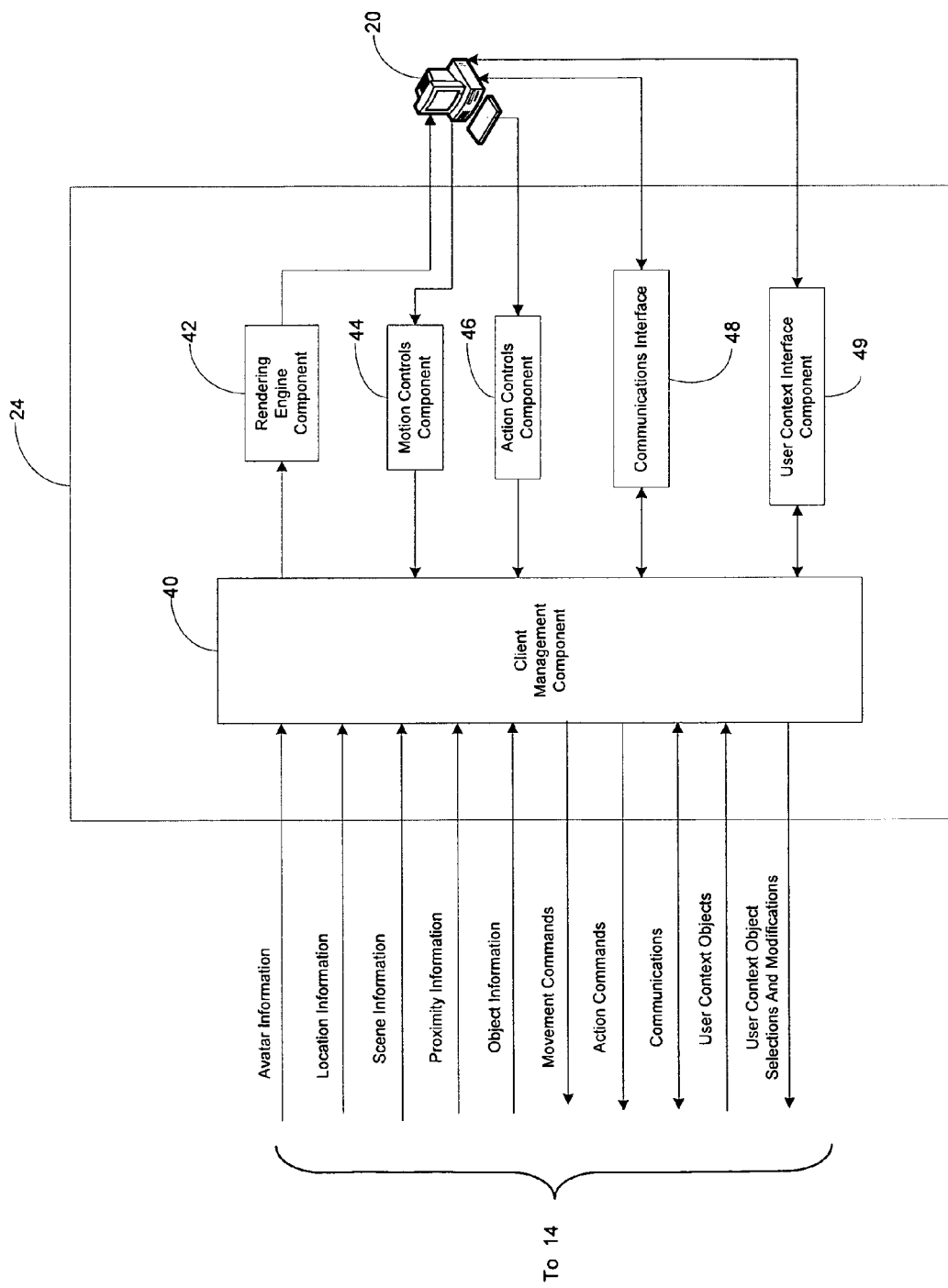
FIG. 3 shows a more detailed view of the virtual universe client shown in FIG. 1.

FIG. 3 shows a more detailed view of the virtual universe client 24 shown in FIG. 1. The virtual universe client 24, which enables users to interact with the virtual universe 12, comprises a client management component 40, which manages actions, movements, selections, modifications and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc. An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and electronic mail (e-mail).

A user context object interface component 49 enables a user to receive user context objects generated for its avatars, make selections to the user context objects and modifications to attributes associated with the selected user context object that describe behavioral, search and informational needs of the avatar and changes to values assigned to these attributes. Although not described herein, it is possible that the user context object interface component 49 can be used to transfer user context objects created by the user. All of this information passing from the user context object interface component 49 via the user is received by the client management component 40 for transmission to the server array 14. Below are additional details of the generation, selection and modification of these user context objects.

FIG. 3 shows the various types of information received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.) and what actions are possible for nearby objects (e.g., postures, movements, etc.). FIG. 3 also shows the movement commands and action commands that are generated by the user are sent to the server array via the client management component 40, as well as the communications that can be sent to the users of other avatars within the virtual universe.

Figure 4:
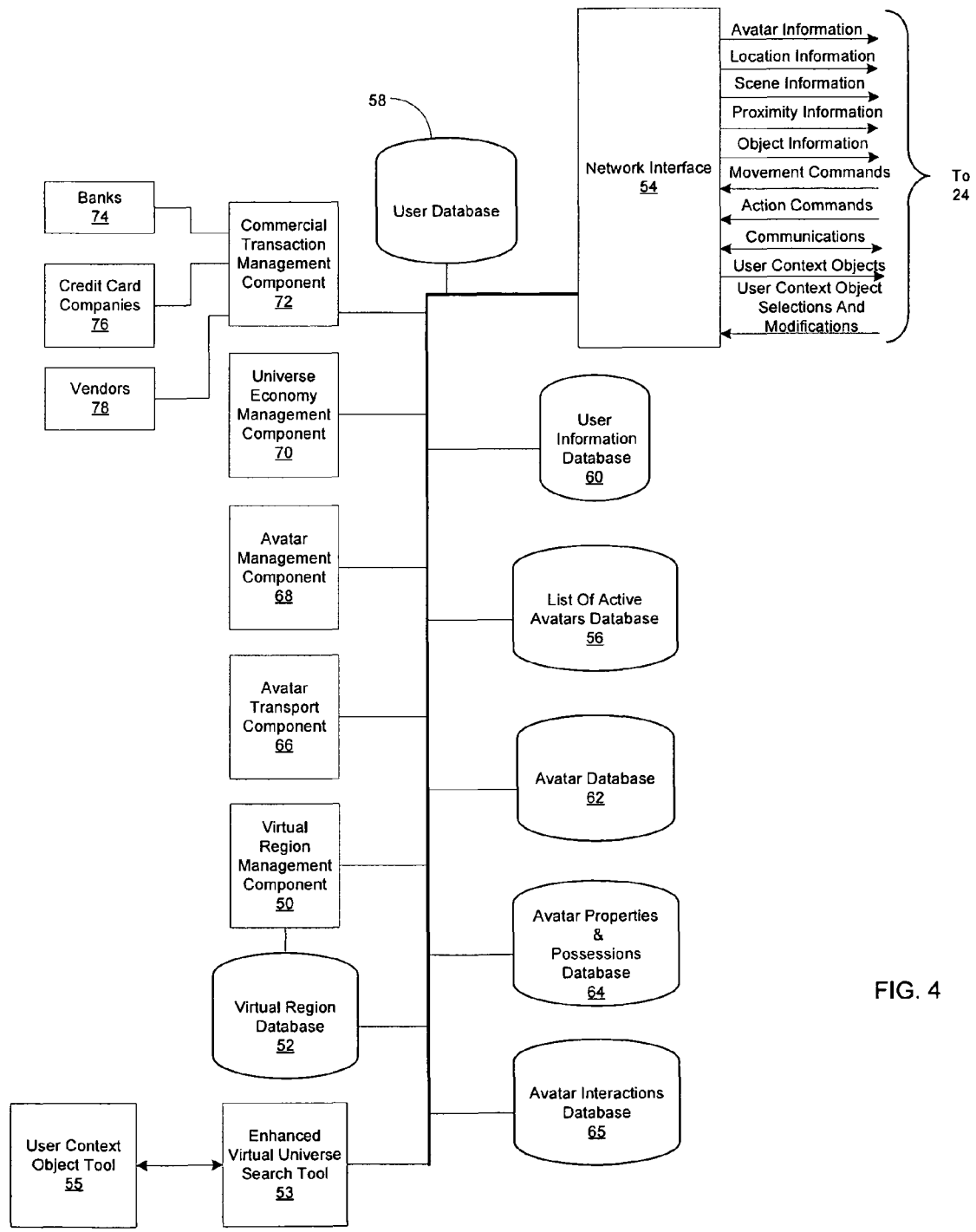
FIG. 4 shows a more detailed view of some the functionalities provided by the server array shown in FIG. 1.

FIG. 4 shows a more detailed view of some the functionalities provided by the server array 14 shown in FIG. 1. In particular, FIG. 4 shows a virtual region management component 50 that manages a virtual region within the virtual universe. In particular, the virtual region management component 50 manages what happens in a particular region such as the type of landscape in that region, the amount of homes, commercial zones, boutiques, streets, parks, restaurants, etc. For example, the virtual region management component 50 would allow the owner of a particular region or establishment within the region to specify requirements for entering or remaining within the region that could potentially affect certain avatar characteristics. In addition, the virtual region management component 50 would allow the owner of a particular region or establishment to provide a textual description that describes the area in more detail so that the avatars can ascertain if there will be a potential effect on their use of specific inventory items within that region. Those skilled in the art will recognize that the virtual region management component 50 can manage many other facets within the virtual region.

A virtual region database 52 stores information on all of the specifics in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

An enhanced virtual universe search tool 53 allows avatars of the virtual universe 12 through their users to perform searches to submitted queries based on user context objects that are explicitly selectable and modifiable by the avatars. In addition, the enhanced virtual universe search tool 53 provides a user context to submitted queries that is derived from past behavior in the virtual world and real world without relying on input from the avatar. Below is a more detailed discussion of the enhanced virtual universe search tool 53 and how it performs some of the above-mentioned functions.

A user context object tool 55 allows avatars of the virtual universe 12 through their users to select, modify and use these user context objects in a variety of applications in addition to performing resource search. For example, the user context object tool 55 permits avatars to use these user context objects to configure a robot avatar that allows the avatar to interact anonymously and semi-autonomously within the virtual universe 12, alter avatar characteristics so that an avatar can have the opportunity to interact within the virtual universe in a different manner, receive presence-based marketing opportunities while on-line in the virtual universe, and allow the avatar to have different characteristics for different business and social interactions within the virtual universe. Below is a more detailed discussion of the user context object tool 55 and how it performs some of the above-mentioned functions.

FIG. 4 shows a network interface 54 that enables the server array 14 to interact with the virtual universe client 24 residing on computer 20. In particular, the network interface 54 communicates avatar, location, scene, proximity, object, and user context object information to the user through the virtual universe client 24 and receives movement and action commands as well as communications and user context object selection and modification from the user via the universe client.

As shown in FIG. 4, there are several different databases for storing information. In particular, database 56 contains a list of all the avatars that are online in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features) while database 64 contains an inventory listing properties and possessions that each avatar owns such as hair pieces, weapons, jewelry, houses, cars, sporting equipment, appearance, attire, etc.

Additional items within database 64 can include user context objects generated for the avatars. Those skilled in the art will recognize that these user context objects could reside in other places besides database 64 and still be received by the user context interface component 49. These user context objects may be comprised of text and an accompanying graphical object. For example, one user context object may be represented by a depiction of a woman with children. This graphical depiction, in addition to any text, is useful to help the user find and remember the various contexts and to realize that such a context is in effect at a certain time. A man shaped like a computer with a job needed sign to designate a software engineer looking for a job may represent a second user context object. When the second user context object is brought out of the inventory, the avatar is perceived differently than when the first object is brought out. The user context object is composed of a number of attributes each of which could take on one of a number of values. For example, the user context object could be labeled "single women looking for significant other" or "single mom with kids". As will be described below, these user context objects can be used in a variety of applications (e.g., used to enhance searches for travel services in the virtual universe and optionally in the real world).

Avatar interactions database 65 contains general interaction information by avatars such as the number and nature of their type of teleports within the virtual universe 12, patterns of movement within the virtual universe that are indicative of how adept avatars are with regard to moving and navigating about the universe 12, eating preferences at restaurants in the virtual universe, recreational preferences, etc. Those skilled in the art will recognize that databases 58-65 may contain additional information if desired. For example, there may be a separate database configured to store these user context objects generated for the avatars within the virtual universe 12. Although the above information is shown in FIG. 4 as being stored in databases, those skilled in the art will recognize that other means of storing information can be utilized.

An avatar transport component 66 enables users to transport, which as mentioned above, allows avatars to transport through space from one point to another point, instantaneously. As a result, an avatar could for example travel from a business region to an entertainment region to hear a concert.

An avatar management component 68 keeps track of what online avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc. In one embodiment of the invention, avatar activities such as specific shopping and eating behaviors are stored in the avatar interactions database 65.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. The avatar could make a purchase of a service using the virtual universe currency. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78.

Although not expressly shown in FIG. 4, all of the components shown in the figure are configured to interact with each other. The components that are shown as being interconnected are illustrated in that manner to convey the close interactions that exist between these components such as for example, the banks 74, credit card companies 76, and vendors with the commercial transaction management component 72.

Figure 5:
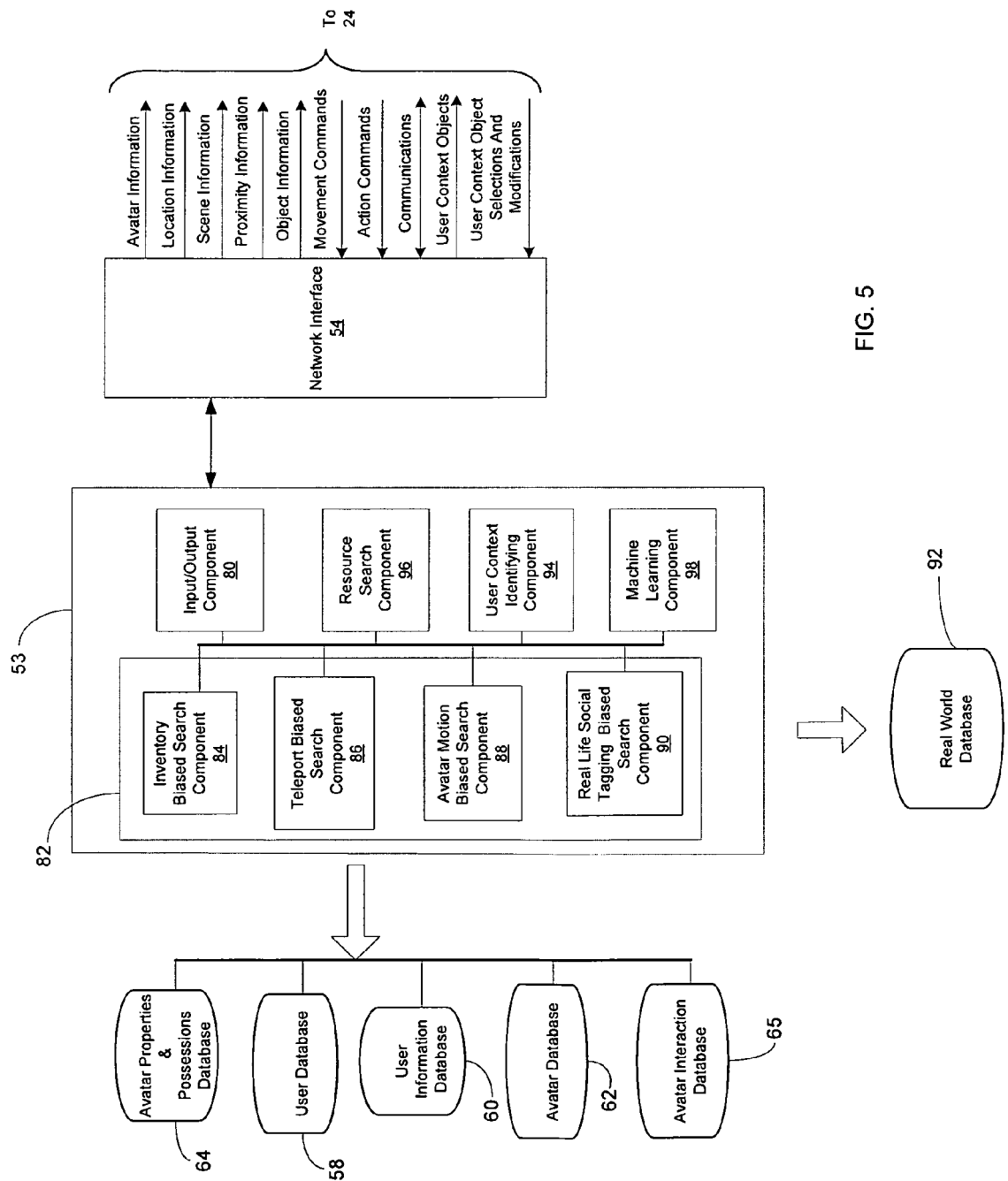
FIG. 5 shows an enhanced virtual universe search tool according to one embodiment of this invention that operates in the environment shown in FIG. 1.

FIG. 5 shows a more detailed view of the enhanced virtual universe search tool 53 according to one embodiment of this invention that operates in the environment of FIG. 1. As shown in FIG. 5, in this embodiment, the enhanced virtual universe search tool 53 resides on the same computer system as the server 14 and communicates directly to the virtual universe and its residents via the virtual universe client 24. In other embodiments, the enhanced virtual universe search tool 53 might reside on the same computers as the virtual universe client 24, or reside on separate computers in direct communication with the virtual universe servers 16 and virtual universe clients 24. For example, the search tool might reside on separate computers provided by a third party as a service to the virtual universe provider or the avatar of an individual user.

Referring back to FIG. 5, the enhanced virtual universe search tool 53 includes an input/output component 80 that is configured to receive input and generate output to the virtual universe client 24 via the network interface 54. In particular, the input/output component 80 receives queries for searches within the virtual universe 12 from users via the virtual universe client 24 and returns the results of the search to the users via the client. The enhanced virtual universe search tool 53 further includes a scanning component 82 configured to scan a collection of avatar data describing attributes that are relevant to behavioral, search and informational needs of the avatar (i.e., the user) making the query.

As shown in FIG. 5, the scanning component 82 includes an inventory biased search component 84, a teleport biased search component 86, an avatar motion biased search component 88 and a real life social tagging biased search component 90. The inventory biased search component 84 is configured to search inventory items belonging to the avatar that are stored in the avatar properties and possessions database 64. The teleport biased search component 86 is configured to search teleportation history of the avatar that is stored in the avatar interaction database 65. The avatar motion biased search component 88 is configured to search motion history of the avatar that is also stored in the avatar interaction database 65. The real life social tagging biased search component 90 is configured to search social tagging behavior exhibited by the user of the avatar in the real world. FIG. 5 shows the social tagging behavior exhibited by users of the virtual universe 12 stored in a real world database 92, however, those skilled in the art will recognize that this behavior may be stored in a multitude of databases or repositories that tag behavior of users throughout the real world and even virtual worlds outside of the virtual universe 12. Well-known data acquisition techniques can be used by the real life social tagging biased search component 90 to access this type of information from a wide variety of different databases. As shown in FIG. 5, the inventory biased search component 84, teleport biased search component 86, avatar motion biased search component 88 and real life social tagging biased search component 90 also have access to user database 58, user information database 60 and avatar database 62 if it is desired to have such information.

A user context identifying component 94 is configured to identify a user context from the collection of avatar data scanned by the scanning component 82. In one embodiment, the user context identifying component 94 is able to use matching techniques to assign mutually exclusive category designations to avatar data in each particular dimension. In particular, for each dimension of avatar data from databases 58-65, user context identifying component 94 compares the specific avatar's data to a list of category designations with associated criteria. For example, the history of an avatar's motions (frequency of jitter and irregular movements and subsequent corrections to efficiently arrive at a destination) is compared with criteria associated with a list of category designations (virtual universe "expert", virtual universe "competent", virtual universe "challenged", etc.) to identify a value (for example virtual universe "challenged") associated with an attribute "mobility".

A resource search component 96 is configured to reformulate the query to take into account the user context identified for the avatar by the user context identifying component 94. The resource search component 96 then searches databases 58-65, real world database 92, or any other database within the server array 14 and returns search results for the query to the user via the input/output component 80.

U.S. patent application Ser. No. 12/127,174 entitled "APPLICATION OF USER CONTEXT TO SEARCHES IN A VIRTUAL UNIVERSE" and filed concurrently with this application provides examples of how the inventory biased search component 84, teleport biased search component 86, avatar motion biased search component 88 and the real life social tagging biased search component 90 can be used individually to determine user contexts. Those skilled in the art will recognize that the scanning component 82 can use any combination of the inventory biased search component 84, teleport biased search component 86, avatar motion biased search component 88 and the real life social tagging biased search component 90 in combination to identify a user context for a query transmitted by an avatar.

In another embodiment of this invention, the enhanced virtual universe search tool 53 is configured to use a machine learning component 98 to determine a user context for the query generated by the avatar. In this embodiment, the machine learning component 98 uses past behavior in the virtual universe or past behavior exhibited by the user of the avatar in the real world to assist in identifying a user context. In particular, the machine learning component 98 uses well known unsupervised machine learning techniques to discover and update user contexts from past behavior in the virtual universe and the real world combined with supervised machine learning techniques to refine user context attributes and values based on user interactions with the enhanced virtual universe search tool 53.

Additional details of using unsupervised and supervised machine learning techniques in a search service are set forth in U.S. Pat. No. 6,701,311 entitled "Customer Self Service System for Resource Search and Selection"; U.S. Pat. No. 6,778,193 entitled "Customer Self Service Iconic Interface for Portal Entry and Search Specification"; U.S. Pat. No. 6,853,998 entitled "Customer Self Service Subsystem for Classifying User Contexts"; U.S. Pat. No. 6,643,639 entitled "Customer Self Service Subsystem for Adaptive Indexing of Resource Solutions and Resource Lookup"; U.S. Pat. No. 6,785,676 entitled "Customer Self Service Subsystem for Response Set Ordering and Annotation"; U.S. Pat. No. 6,693, 651 entitled "Customer Self Service Iconic Interface for Resource Search Results Display and Selection"; and U.S. Pat. No. 6,873,990 entitled "Customer Self Service Subsystem for Context Cluster Discovery and Validation."

In this invention, the machine learning component 98 discovers and updates user contexts from past behavior in the virtual universe with unsupervised machine learning techniques in the following manner. As described previously, the enhanced virtual universe search tool 53 includes a scanning component 82 configured to scan a collection of avatar data describing attributes that are relevant to behavioral, search and information needs of the avatar (i.e. the user) making the query. Prior to the submission of a user's query, the enhanced virtual universe search tool 53 uses previously disclosed clustering mechanisms and a distance metric for associating closeness of the user interaction data. The machine learning component 98 clusters the avatar data according to the distance metric to determine new user contexts (example: senior citizen virtual universe beginner, young single, etc.) and associated attributes (age, religion; mobility) and values (young adult, middle age, senior citizen; Catholic, Jewish, Protestant; virtual universe expert, virtual universe competent, virtual universe challenged). As additional avatar data becomes available, machine learning component 98 updates the initially identified user contexts and associated attributes and values using processes previously disclosed in U.S. Pat. No. 6,873,990. These unsupervised machine learning techniques leverage the user interaction data of all avatars, not just the avatar performing the search, by enriching the data associated with the avatar performing the search with data associated with similar avatars as determined by clustering processes. This embodiment of the invention uses machine learning to benefit all avatars over time, not just the specific avatar doing the search.

In this invention, the machine learning component 98 uses supervised machine learning techniques to refine user context attributes and values based on user interactions. In this embodiment of the invention, user selections in response to the presentation of query search results provide training data to inform the identification of user contexts and associated attributes and values referenced when a specific user performs a future query.

Although not expressly shown in FIG. 5, all of the components of the enhanced virtual universe search tool 53 are configured to interact with each other. The components that are shown as being interconnected are illustrated in that manner to convey the close interactions that exist between these components.

Below are details on how the enhanced virtual universe search tool 53 interacts with the user context object tool 55. In particular, below are details on how the user context identified by the user context identifying component 94 and the machine learning component 98 can be used in conjunction with the user context object tool 55 to perform a variety of different functions.

Figure 6:
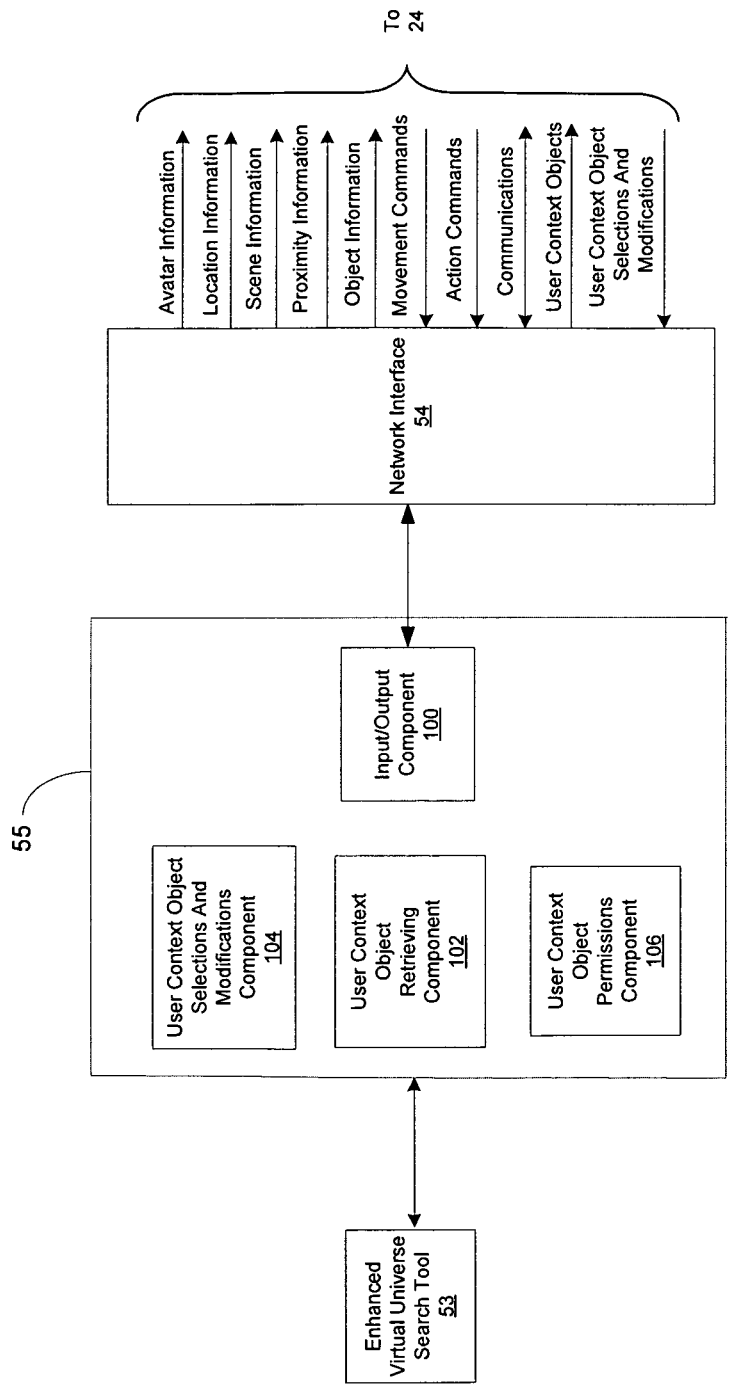
FIG. 6 shows a user context object tool according to one embodiment of this invention that operates in the environment shown in FIG. 1.

FIG. 6 shows a schematic block diagram of the user context object tool 55 according to one embodiment of this invention. As shown in FIG. 6, in this embodiment, the user context object tool 55 resides on the same computer system as the server 14 and communicates directly to the virtual universe and its residents via the virtual universe client 24. In other embodiments, the user context object tool 55 might reside on the same computers as the virtual universe client 24, or reside on separate computers in direct communication with the virtual universe servers 16 and virtual universe clients 24. For example, the search tool might reside on separate computers provided by a third party as a service to the virtual universe provider or the avatar of an individual user.

Referring back to FIG. 6, the user context object tool 55 includes an input/output component 100 that is configured to receive input and generate output to the virtual universe client 24 via the network interface 54. In particular, the input/output component 100 outputs user context objects stored in the avatars' inventories or user context objects generated from the enhanced virtual universe search tool 53. In addition, the input/output component 100 receives user context object selections and modifications made from users via the virtual universe client 24. For example, a user could select a user context object (e.g., single mom with children) from a group of user context objects derived for the user (e.g., single mom looking for significant other, software engineer looking for employment). For this selection, the user could change the attribute values associated with the selected user context object (e.g., change the mode of transportation from fly to drive to save money when traveling with a large family).

Although not illustrated in the figures, users could select from among a choice of user context objects and modify attribute values through a graphical user interface. This graphical user interface would allow the user to make these selections and modifications to the enhanced virtual universe search tool 53 and the user context object tool 55 via the input/output interface component 100. More specifically, a previously disclosed context selection workspace enables the expression of user context as part of a query in a manner optimized for ease of use. The user selects from one of the displayed user context icons by clicking on it. A previously disclosed detail specification workspace enables users to change the values associated with attributes comprising the selected user context. If a user mouse clicks on any of the context attributes, a pull down menu of graphic elements shows all the possible attribute values for this particular user context attribute. Additional details of using a graphical user interface in a search service are set forth in U.S. Pat. No. 6,778,193 entitled "Customer Self Service Iconic Interface for Portal Entry and Search Specification" and U.S. Pat. No. 6,693,651 entitled "Customer Self Service Iconic Interface for Resource Search Results Display and Selection".

The user context object tool 55 further includes a user context object retrieving component 102 configured to retrieve all of the user context objects that have been determined applicable for an avatar. In particular, the user context object retrieving component 102 retrieves user context objects stored in the inventory of the avatar or any user context objects generated from the enhanced virtual universe search tool 53 (e.g., the user context identifying component 94 and the machine learning component 98).

A user context object selections and modifications component 104 is configured to receive and implement user context object selections and modifications made to these object selections. In particular, the user context object selections and modifications component 104 receives a selection of a user context object from an avatar after having been presented with a group of user context objects generated for the avatar. In addition, the user context object selections and modifications component 104 receives any desired modifications made by the avatar to the attribute values associated with the user context object selection.

A user context object permissions component 106 is configured to permit the avatar to interact with the virtual universe in accordance with the user context object selection. In particular, the user context object permissions component 106 is configured to permit one of many possible interactions. In one embodiment, the user context object permissions component 106 permits performing a user context search within the virtual universe for a resource using the selected and modified user context object. In another embodiment, the user context object permissions component 106 permits applying the user context object selection to a robot avatar that is configured to allow the avatar to interact anonymously and semi-autonomously within the virtual universe. In a third embodiment, the user context object permissions component 106 provides an opportunity for the avatar to interact within the virtual universe 12 with altered avatar characteristics. In a fourth embodiment, the user context object permissions component 106 permits the avatar to receive presence-based marketing opportunities while on-line in the virtual universe. In still another embodiment, the user context object permissions component 106 allows the avatar to have different characteristics for different business and social interactions within the virtual universe. Those skilled in the art will recognize the applications of the user context objects are only illustrative of some of the possible uses for these objects and are not meant to be limiting. Below is a description of some examples of how the user context object tool 55 can be used in some of these applications.

The following example illustrates how the enhanced virtual universe search tool 53 and the user context object tool 55 can be used to perform a simple search within the virtual universe 12. In this example, a user via its avatar enters a text query within the virtual universe 12 for "parks". The enhanced virtual universe search tool 53 scans a user context object that a user has withdrawn from inventory (e.g. "single mom with children") using the user context object tool 55. The enhanced virtual universe search tool 53 scans park landmarks, optimizing for the user context object. In particular, the enhanced virtual universe search tool 53 looks for textual descriptions of parks that contain the word "children". The enhanced virtual universe search tool 53 addresses the query by returning a list of parks that were found (e.g. perhaps these parks are child friendly or have rides for children).

A more sophisticated search embodiment would take advantage of the machine-learning component 98 of the enhanced virtual universe search tool 53 and the user context object tool 55. Operation of this search embodiment could be as follows. Prior to a user signing on, the enhanced virtual universe search tool 53 performs a preprocessing operation comprising an automatic clustering process which uses unsupervised machine learning techniques to discover and update user contexts from past behavior of other users in virtual universes and the real world. When the user logs in to virtual universe, he or she has the option to select from a list of available data in the virtual world and real world, including their virtual universe inventory and teleport history and their real world shopping history and social tagging behavior. With this option, the user selects from one of several presented user contexts. The user can then optionally customize (e.g., modify) the user context of the selected user context object by selecting different attribute values. Thus, when a user enters a search query, results are presented to the user in context of user attributes and values. If desired, the user can further refine user context attribute values and resubmit the search. As the user explores promising resources from the resulting response set, the enhanced virtual universe search tool 53 captures the user's interactions to further refine the user context attributes and values for their next use. In addition, the enhanced virtual universe search tool 53 uses these new user contexts, attributes and values for the benefit of all users within the virtual universe via the machine learning component 98.

The following illustrates a detailed example of the machine-learning component 98 of the enhanced virtual universe search tool 53 and the user context object tool 55 used to perform a more sophisticated search. In this example, a user has decided to take a virtual vacation and plans to do a search for "warm water resorts." The avatar of the user is female and based on several earlier teleports to virtual universe sites catering to senior citizens, the enhanced virtual universe search tool 53 has identified the user context "senior citizen" as most likely representing the context of the user and, for the attribute "gender" has assigned the value "female." Upon logging in, the user is presented with three user contexts: 1) senior citizen; 2) single and looking for significant other; and 3) single mom with kids, with the first choice designated as "recommended". Although the user in real life is 67 years old and a senior citizen, she decides to select another user context—"single and looking for significant other"—for this search.

The enhanced virtual universe search tool 53 with the user's prior permission has surveyed her avatar's inventory and noted a number of items related to cameras. For the attribute "importance of audit trail/capture memories," the value selected is "important" instead of alternatives such as "unimportant" for other avatars. This attribute-value pair will also inform the search by locating vacation resources with nearby available camera services. Similarly, the enhanced virtual universe search tool 53 with the user's permission, searched the avatar's motion control history and concluded that the user is relatively unskilled in flying and maneuvering her avatar in tight spaces. For the attribute "mobility" the enhanced virtual universe search tool 53 has selected the value "challenged" which the user does not elect to modify through the user context object tool 55. The "mobility-challenged" attribute-value pair will inform the search by highlighting vacation locations not requiring complex avatar motion control.

Similarly, the enhanced virtual universe search tool 53 has with the user's permission applied analytics to the user's online book shopping history and their tagging behavior in the real world to conclude that the user is interested in the history of indigenous people in the Americas. In addition, the enhanced virtual universe search tool 53 has reviewed the number and nature of the user's teleports (e.g., a teleport log) in the virtual universe and noted a number of trips to historical sites. As a result, for the attribute "interests and passions", the enhanced virtual universe search tool 53 has associated the value "history" along with the value "single men" which is a default choice for the "interests and passions" attribute for the selected context "single and looking for significant other" if the avatar is female. Optionally, if the user is actually male, or a gay female, they can override the values associated with the "passions" attribute to better suit their requirements through the user context object tool 55.

As the user explores promising resources from the resulting response set, the user's interactions with the enhanced virtual universe search tool 53 are captured to further refine their user context attributes and values for their next use of the search tool. For example, if the user selects only warm water resorts described as challenging from a mobility perspective, the enhanced virtual universe search tool 53 will modify the default "mobility" attribute's value to "active" when the user selects the "single and looking for significant other" user context with the user context object tool 55 for future searches. The enhanced virtual universe search tool 53 will then optionally change the default user context for this user to "single and looking for significant other" although the default attribute values used for the initial presentation will have been updated to reflect the user's explorations of previous response sets.

The following example illustrates how the user context object tool 55 can be used to receive presence based advertising to nearby establishments and services based on the selected user context's attributes and values. In this example, the user is a single mom who is taking her children on a virtual universe vacation with her and she selects the user context "single mom with kids" so that any location based services in virtual universes deploying presence (proximity) based advertisements are consistent with the attributes and values associated with this user context. For example, for the attribute "housing", the user context would have included the values "cooking", "inexpensive" and "pool" which the user had chosen not to modify. On another occasion, when the single mom is traveling alone in the hopes of meeting men, she selects the user context "single and looking for significant other." For this user context, the user context object tool 55 has identified for the "housing" attribute the values "nightclub" and "golf", thus enabling this user's avatar to receive presence based advertising consistent with her single status on this virtual trip. If she is more interested in tennis than golf, she can override the golf attribute value so nearby single resorts with tennis facilities send her advertisements via text messages to her virtual cell-phone. Alternatively, if she only responds to tennis-related location based marketing, the user context object tool 55 will automatically override the golf attribute value for subsequent virtual trips.

If desired, the user context object tool 55 may also automatically select or prompt the user to select a potentially useful user context. For example, if it is noted that when the avatar is near a certain set of avatars (e.g., her children), she selects "single mom with kids" after a few times it may be the default when she is around those avatars.

The following example illustrates how the user context object tool 55 can be used to alter avatar characteristics in social and business interactions within the virtual universe. For example, the user context object tool 55 can be used to enable a user to associate a selected user context object with a robot avatar (e.g., non-playing character in massively multiplayer online role-playing games—MMORPGs). This functionality enables anonymous virtual universe shopping searches or participation in virtual dating services so the user can avoid generating virtual universe activity such as additional inventory items and teleport logs which would modify the current default user context attributes and values unless manually excluded or overridden prior to future searches or receipt of presence based marketing.

Alternatively, users could use the user context object tool 55 to copy their current default user context and then modify the copy by changing selected attribute values in order to experiment with searching and interacting from a somewhat different user context. For example, a resident might wish to experience social and business interactions from the perspective of a person of color and could therefore temporarily alter the value associated with the "race" attribute from "white" to "black". While the physical representation of avatars in virtual universes often does not correspond in many cases with the gender and race of the users themselves, artifacts such as the exchange of business cards containing real life identifying information and pictures as well as home addresses ("Harlem") or university affiliation ("Howard University") provide the opportunity to experience social and business interactions from the perspective of an altered "face" to the world. This embodiment can be used for sensitizing employees in an enterprise to the new realities of global commerce.

In another embodiment, residents could inactivate their user context with the user context object tool 55 and with permission, copy the user context of a personal friend or business colleague in order to experience searching and social and business interactions from their perspective. This enables the resident to create on-the-fly flavors of avatars also referred to as avatar subtypes.

In another embodiment of this invention, the user context object tool 55 along with other features described herein (e.g., the enhance virtual universe search tool 53) can be used as a service to charge fees for uses of the user context objects (e.g., charge a fee for each search that is run for a query). In this embodiment, the provider of the virtual universe or a third party service provider could offer this user context search as a service by performing the functionalities described herein on a subscription and/or fee basis. Those skilled in the art will recognize that other parties could provide services that are within the scope of this invention. For example, organizations (e.g., market research enterprises) which provide resources to the virtual universe could be charged a fee for using the user contexts. In these cases, the provider of the virtual universe or the third party service provider (e.g., a virtual universe resource provider) can create, deploy, maintain, support, etc., the user context object tool 55 and other features described herein (e.g., the enhanced virtual universe search tool 53) that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to facilitate the use of user context objects. In this case, the user context object tool 55 and other features described herein (e.g., the enhanced virtual universe search tool 53) can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 7:
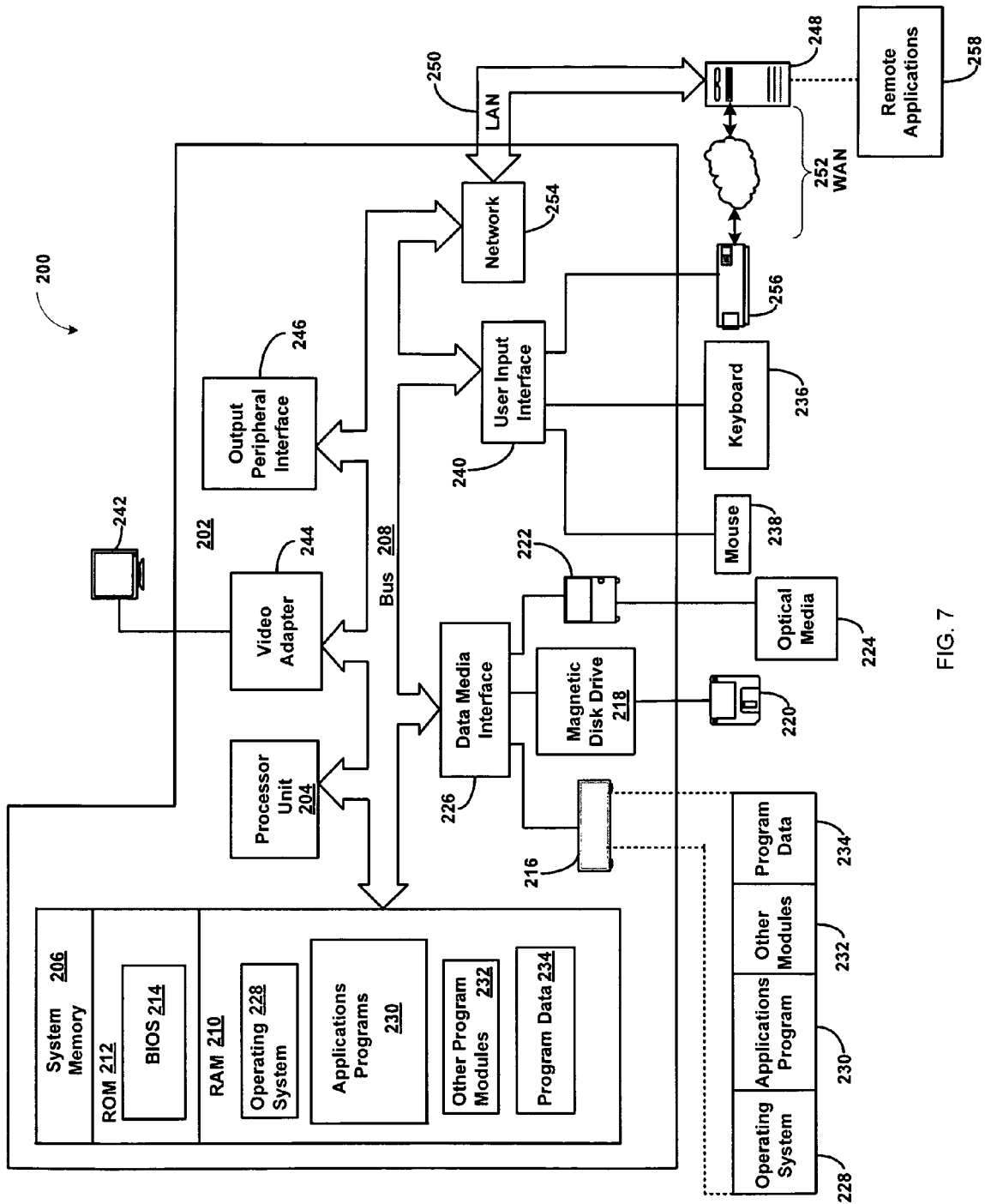
FIG. 7 shows a schematic of an exemplary computing environment in which elements of the networking environment shown in FIG. 1 may operate.

FIG. 7 shows a schematic of an exemplary computing environment in which elements of the networking environment shown in FIG. 1 may operate. The exemplary computing environment 200 is only one example of a suitable computing environment and is not intended to suggest any limitation as to the scope of use or functionality of the approach described herein. Neither should the computing environment 200 be interpreted as having any dependency or requirement relating to any one or combination of components illustrated in FIG. 7.

In the computing environment 200 there is a computer 202 which is operational with numerous other general purpose or special purpose computing system environments or configurations. Examples of well known computing systems, environments, and/or configurations that may be suitable for use with an exemplary computer 202 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 202 may be described in the general context of computer-executable instructions, such as program modules, being executed by a computer. Generally, program modules include routines, programs, objects, components, logic, data structures, and so on, that performs particular tasks or implements particular abstract data types. The exemplary computer 202 may be practiced in distributed computing environments where tasks are performed by remote processing devices that are linked through a communications network. In a distributed computing environment, program modules may be located in both local and remote computer storage media including memory storage devices.

As shown in FIG. 7, the computer 202 in the computing environment 200 is shown in the form of a general-purpose computing device. The components of computer 202 may include, but are not limited to, one or more processors or processing units 204, a system memory 206, and a bus 208 that couples various system components including the system memory 206 to the processor 204.

Bus 208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 202 typically includes a variety of computer readable media. Such media may be any available media that is accessible by computer 202, and it includes both volatile and non-volatile media, removable and non-removable media.

In FIG. 7, the system memory 206 includes computer readable media in the form of volatile memory, such as random access memory (RAM) 210, and/or non-volatile memory, such as ROM 212. A BIOS 214 containing the basic routines that help to transfer information between elements within computer 202, such as during start-up, is stored in ROM 212. RAM 210 typically contains data and/or program modules that are immediately accessible to and/or presently operated on by processor 204.

Computer 202 may further include other removable/non-removable, volatile/non-volatile computer storage media. By way of example only, FIG. 7 illustrates a hard disk drive 216 for reading from and writing to a non-removable, non-volatile magnetic media (not shown and typically called a "hard drive"), a magnetic disk drive 218 for reading from and writing to a removable, non-volatile magnetic disk 220 (e.g., a "floppy disk"), and an optical disk drive 222 for reading from or writing to a removable, non-volatile optical disk 224 such as a CD-ROM, DVD-ROM or other optical media. The hard disk drive 216, magnetic disk drive 218, and optical disk drive 222 are each connected to bus 208 by one or more data media interfaces 226.

The drives and their associated computer-readable media provide nonvolatile storage of computer readable instructions, data structures, program modules, and other data for computer 202. Although the exemplary environment described herein employs a hard disk 216, a removable magnetic disk 218 and a removable optical disk 222, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 216, magnetic disk 220, optical disk 222, ROM 212, or RAM 210, including, by way of example, and not limitation, an operating system 228, one or more application programs 230, other program modules 232, and program data 234. Each of the operating system 228, one or more application programs 230 (e.g., the enhanced virtual universe search tool 53 and the user context object tool 55), other program modules 232, and program data 234 or some combination thereof, may include an implementation of the networking environment 10 of FIG. 1 including the server array 14, the virtual universe client 24, the enhanced virtual universe search tool 53 and the user context object tool 55.

A user may enter commands and information into computer 202 through optional input devices such as a keyboard 236 and a pointing device 238 (such as a "mouse"). Other input devices (not shown) may include a microphone, joystick, game pad, satellite dish, serial port, scanner, camera, or the like. These and other input devices are connected to the processor unit 204 through a user input interface 240 that is coupled to bus 208, but may be connected by other interface and bus structures, such as a parallel port, game port, or a universal serial bus (USB).

An optional monitor 242 or other type of display device is also connected to bus 208 via an interface, such as a video adapter 244. In addition to the monitor, personal computers typically include other peripheral output devices (not shown), such as speakers and printers, which may be connected through output peripheral interface 246.

Computer 202 may operate in a networked environment using logical connections to one or more remote computers, such as a remote server/computer 248. Remote computer 248 may include many or all of the elements and features described herein relative to computer 202.

Logical connections shown in FIG. 7 are a local area network (LAN) 250 and a general wide area network (WAN) 252. Such networking environments are commonplace in offices, enterprise-wide computer networks, intranets, and the Internet. When used in a LAN networking environment, the computer 202 is connected to LAN 250 via network interface or adapter 254. When used in a WAN networking environment, the computer typically includes a modem 256 or other means for establishing communications over the WAN 252. The modem, which may be internal or external, may be connected to the system bus 208 via the user input interface 240 or other appropriate mechanism.

In a networked environment, program modules depicted relative to the personal computer 202, or portions thereof, may be stored in a remote memory storage device. By way of example, and not limitation, FIG. 7 illustrates remote application programs 258 as residing on a memory device of remote computer 248. It will be appreciated that the network connections shown and described are exemplary and other means of establishing a communications link between the computers may be used.

An implementation of an exemplary computer 202 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for explicit use of user context objects in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for facilitating use of a plurality of user context objects determined for an avatar that is online in a virtual universe, comprising:

presenting the plurality of user context objects to the avatar, wherein the presenting of the plurality of user context objects to the avatar includes deriving the plurality of user context objects from all of the following: inventory items belonging to the avatar, teleportation history of the avatar, motion history of the avatar and social tagging behavior exhibited by a user of the avatar in the real world;

receiving a user context object selection from the avatar, wherein the user context object selection contains one of the plurality of user context objects determined for the avatar and any desired modifications made to the user context object selected by the avatar; and permitting the avatar to interact with the virtual universe in accordance with the user context object selection, wherein the permitting of the avatar to interact with the virtual universe includes applying the user context object selection to a robot avatar that is configured to allow the avatar to interact anonymously and semi-autonomously within the virtual universe.

2. The method according to claim 1, wherein the presenting of the plurality of user context objects to the avatar includes retrieving the plurality of user context objects from an inventory of the avatar that contains items belonging to the avatar that are for use in the virtual universe.

3. The method according to claim 1, wherein the deriving of the plurality of user context objects comprises using unsupervised and supervised machine learning techniques, wherein the unsupervised machine learning technique clusters avatar data according to a distance metric to determine user context objects, associated attributes and values for the attributes and updates the user context objects, associated attributes and values as more avatar data becomes available, wherein the supervised machine learning technique uses avatar selections in response to a presentation of query search results as training data to identify further user context objects, associated attributes and values for use in future queries made from an avatar.

4. The method according to claim 1, wherein the modifications include changes to attribute values associated with the selected user context object that describe behavioral, search and informational needs of the avatar.

5. The method according to claim 1, wherein the permitting of the avatar to interact with the virtual universe includes performing a search within the virtual universe for a resource that is in accordance with the user context object selection.

6. The method according to claim 1, wherein the permitting of the avatar to interact with the virtual universe includes providing an opportunity for the avatar to interact within the virtual universe with altered avatar characteristics.

7. The method according to claim 1, wherein the permitting of the avatar to interact with the virtual universe includes receiving presence-based marketing opportunities while on-line in the virtual universe.

8. The method according to claim 1, wherein the permitting of the avatar to interact with the virtual universe includes applying the user context object selection to an avatar sub-type of the avatar that is configured to allow the avatar to have different characteristics for different business and social interactions within the virtual universe.

9. A method for performing a search for a resource in a virtual universe using selectable and modifiable user context objects, comprising:
presenting a plurality of user context objects determined for an avatar that is online in the virtual universe, wherein the presenting of the plurality of user context objects to the avatar includes deriving the plurality of user context objects from all of the following: inventory items belonging to the avatar, teleportation history of the avatar, motion history of the avatar and social tagging behavior exhibited by a user of the avatar in the real world;
receiving a user context object selection from the avatar, wherein the user context object selection contains one of the plurality of user context objects determined for the avatar and any desired modifications made to the selected user context object;
receiving a query from the avatar; and
performing a resource search for the query in accordance with the selected user context object; and
providing results from the search to a robot avatar that is configured to allow the avatar to interact anonymously and semi-autonomously within the virtual universe in response to a modification made by the avatar to the selected user context object.

10. The method according to claim 9, wherein the presenting of the plurality of user context objects to the avatar includes retrieving the plurality of user context objects from an inventory of the avatar that contains items belonging to the avatar that are for use in the virtual universe.

11. The method according to claim 9, wherein the modifications include changes to attribute values associated with the selected user context object that describe behavioral, search and informational needs of the avatar.

12. The method according to claim 9, further comprising providing advertisements along with search results in response to a modification made by the avatar to the selected user context object, wherein the advertisements relate to the selected user context object.

13. The method according to claim 9, further comprising using avatar selections in response to a presentation of query search results as training data to identify further user contexts, associated attributes and values for use in future queries.

14. A computer system for facilitating use of a plurality of user context objects determined for an avatar that is online in a virtual universe, comprising:
at least one processing unit;
memory operably associated with the at least one processing unit; and
a user context object tool storable in memory and executable by the at least one processing unit, the tool comprising:
a user context object retrieving component configured to retrieve the plurality of user context objects for presentation to the avatar, wherein the retrieved plurality of user context objects are derived from all of the following: inventory items belonging to the avatar, teleportation history of the avatar, motion history of the avatar and social tagging behavior exhibited by a user of the avatar in the real world;
a user context object selection and modification component configured to receive a user context object selection and any desired modifications made to the user context object selection; and
a user context object permissions component configured to permit the avatar to interact with the virtual universe in accordance with the user context object selection, wherein the user context object permissions component is configured to permit applying the user context object selection to a robot avatar that is configured to allow the avatar to interact anonymously and semi-autonomously within the virtual universe.

15. The computer system according to claim 14, wherein the user context object permissions component of the user context object tool is further configured to permit one of performing a user context search within the virtual universe for a resource, providing an opportunity for the avatar to interact within the virtual universe with altered avatar characteristics, receiving presence-based marketing opportunities while on-line in the virtual universe, or allowing the avatar to have different characteristics for different business and social interactions within the virtual universe.

16. A computer-readable storage medium storing computer instructions, which when executed, enables a computer system to facilitate use of a plurality of user context objects determined for an avatar that is online in a virtual universe, the computer instructions comprising:
presenting the plurality of user context objects to the avatar, wherein the presenting of the plurality of user context objects to the avatar includes deriving the plurality of user context objects from all of the following: inventory items belonging to the avatar, teleportation history of the avatar, motion history of the avatar and social tagging behavior exhibited by a user of the avatar in the real world;
receiving a user context object selection from the avatar, wherein the user context object selection contains one of the plurality of user context objects determined for the avatar and any desired modifications made to the selected user context object; and
permitting the avatar to interact with the virtual universe in accordance with the user context object selection, wherein the permitting of the avatar to interact with the virtual universe includes instructions for applying the user context object selection to a robot avatar that is configured to allow the avatar to interact anonymously and semi-autonomously within the virtual universe.

17. The computer-readable storage medium according to claim 16, wherein the modifications include changes to attribute values associated with the selected user context object that describe behavioral, search and informational needs of the avatar.

18. The computer-readable storage medium according to claim 16, wherein the permitting of the avatar to interact with the virtual universe further includes instructions for one of performing a user context search within the virtual universe for a resource, providing an opportunity for the avatar to interact within the virtual universe with altered avatar characteristics, receiving presence-based marketing opportunities while on-line in the virtual universe, or allowing the avatar to have different characteristics for different business and social interactions within the virtual universe.

19. The computer-readable storage medium according to claim 16, further comprising instructions for implementing the facilitation of the plurality of user context objects in the computer system as a service within the virtual universe.

20. The computer-readable storage medium according to claim 19, further comprising instructions for charging a fee to a virtual universe service provider of the virtual universe, the avatar using the plurality of user context objects, a virtual universe resource provider or a party representing the virtual universe resource provider.

21. A method for deploying a user context object tool for use in a computer system that facilitates use of a plurality of user context objects determined for an avatar that is online in a virtual universe, comprising:

providing a computer infrastructure operable to:

present the plurality of user context objects to the avatar, wherein the presenting of the plurality of user context objects to the avatar includes deriving the plurality of user context objects from all of the following: inventory items belonging to the avatar, teleportation history of the avatar, motion history of the avatar and social tagging behavior exhibited by a user of the avatar in the real world;

receive a user context object selection from the avatar, wherein the user context object selection contains one of the plurality of user context objects determined for the avatar and any desired modifications made to the selected user context object; and permit the avatar to interact with the virtual universe in accordance with the user context object selection, wherein the permit of the avatar to interact with the virtual universe includes applying the user context object selection to a robot avatar that is configured to allow the avatar to interact anonymously and semi-autonomously within the virtual universe.

* * * * *